United States Patent [19]

McLaughlin

[11] 4,395,340

[45] Jul. 26, 1983

[54] ENHANCED OIL RECOVERY METHODS AND SYSTEMS

[75] Inventor: Homer C. McLaughlin, Duncan, Okla.

[73] Assignee: Halliburton Company, Duncan, Okla.

[21] Appl. No.: 282,989

[22] Filed: Jul. 14, 1981

[51] Int. Cl.$^3$ ............................................. C09K 3/00
[52] U.S. Cl. .............................. 252/8.55 D; 526/195; 526/234; 526/238
[58] Field of Search ................. 252/8.55 D; 526/195, 526/234, 238

[56] References Cited

U.S. PATENT DOCUMENTS

| | | | |
|---|---|---|---|
| 3,405,106 | 10/1968 | Scanley | 260/80 |
| 3,509,114 | 4/1970 | Ballast | 260/80 |
| 3,620,991 | 11/1971 | Wasser | 260/29.62 |
| 4,137,969 | 2/1979 | Phalangas et al. | 166/274 |
| 4,297,226 | 10/1981 | Gunter | 252/8.55 D |

Primary Examiner—Joseph L. Schofer
Assistant Examiner—Bernard Lipman
Attorney, Agent, or Firm—Thomas R. Weaver; G. Keith deBrucky

[57] ABSTRACT

A method of enhanced oil recovery from subterranean oil-containing formations via injection through an injection well penetrating the formation of a viscous aqueous solution containing one or more water-soluble organic polymers and forcing such solution through the formation towards a production well for ultimate recovery. The viscous aqueous polymer solutions of the invention are prepared at the site of their use by polymerizing one or more water-soluble polymerizable vinyl monomers in aqueous solutions which may contain high concentrations of one or more salts.

10 Claims, 1 Drawing Figure

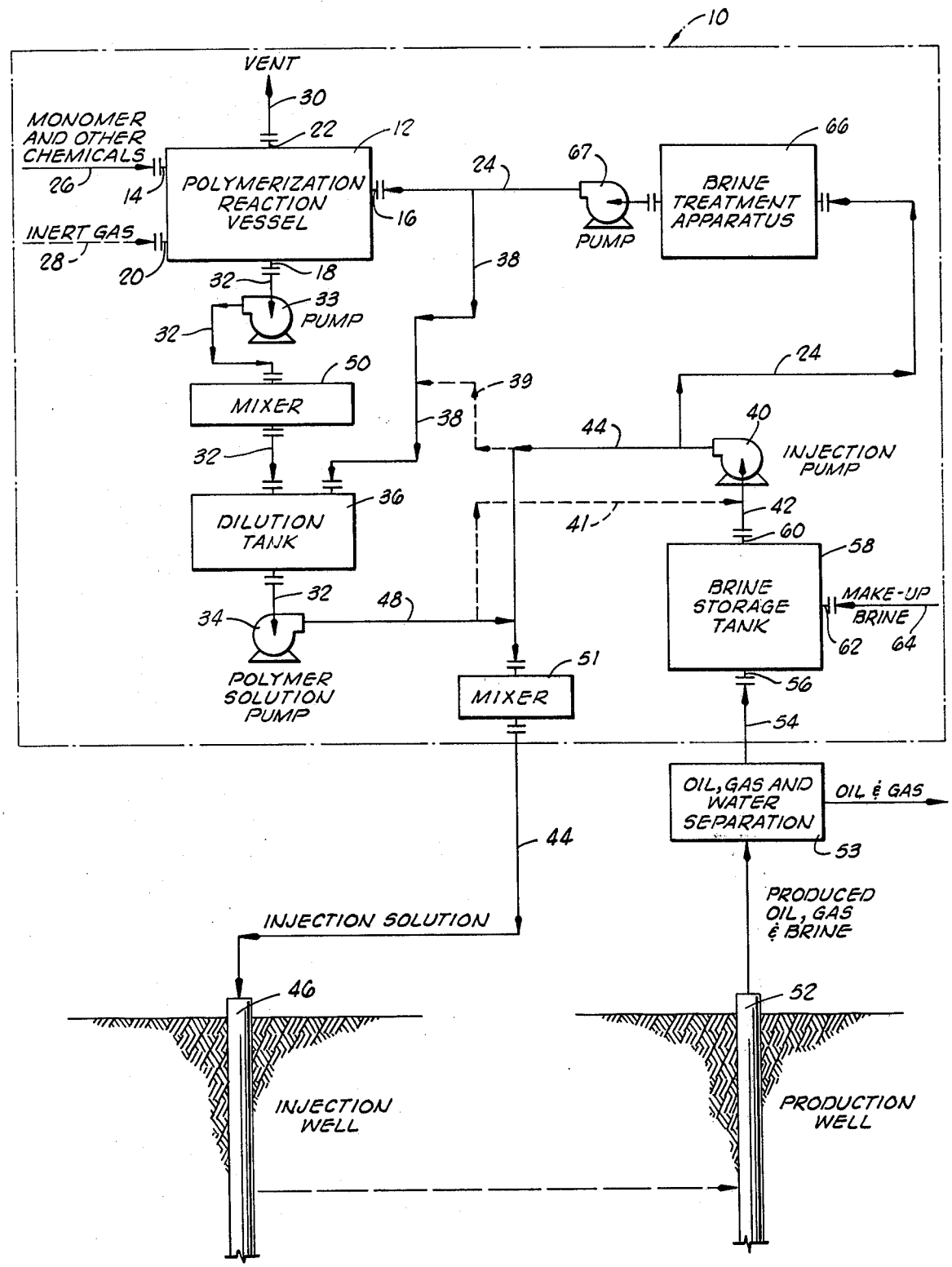

ENHANCED OIL RECOVERY METHODS AND SYSTEMS

This application is related to the simultaneously filed, co-pending patent applications having the Ser. Nos. 283,302 and 283,251.

The present invention relates to the treatment of subterranean hydrocarbon-containing formations with viscous aqueous polymer solutions, and particularly, to the on-site preparation and use of such polymer solutions for enhancing the production of hydrocarbons from subterranean hydrocarbon-containing formations penetrated by one or more well bores.

More particularly, the present invention relates to a method of enhancing the recovery of oil from a subterranean oil-containing formation via polymer flooding, i.e. introduction of polymers into a formation at one point and driving said polymers, as well as formation oil in front thereof, toward a production area, the improvement directed to the combining of water-soluble polymerizable vinyl monomers and a water-soluble ionizing sulfite with an aqueous inorganic salt solution at the site of the injection and production wells whereby the monomers are rapidly polymerized to form a concentrated high viscosity polymer solution, the water-soluble polymerizable vinyl monomers being selected from the group consisting of acrylamide monomers alone, and acrylamide monomers and one or more other vinyl monomers which are copolymerizable therewith; diluting said concentrated high viscosity polymer solution with additional aqueous fluid at the site of the wells to form an injection solution having a desired viscosity; and injecting the resultant solution into the formation.

Also disclosed herein is an invention claimed by John K. Borchardt in U.S. patent application Ser. No. 283,251 relating to methods of enhanced oil recovery and more particularly which is directed to preparing an aqueous injection solution at the site of the injection and production wells by combining one or more particular vinyl monomers with a substantially oxygen-free aqueous solvent; combining the resultant solution with a free radical polymerization initiator to cause the polymerization of the particular vinyl monomers and the formation of a concentrated aqueous viscous polymer solution; diluting said concentrated viscous aqueous polymer solution with additional amount of the same substantially oxygen-free aqueous solvent to thereby form the aqueous injection fluid; and injecting the aqueous injection fluid into the formation by way of said injection well.

Also disclosed herein is an invention claimed by Charles M. Gideon in U.S. patent application Ser. No. 283,302 relating to methods of enhanced oil recovery and more particularly which is directed to the combining of a buffer selected from the group consisting of sodium and potassium tetraborate, sodium, potassium and lithium tetraborate pentahydrate, sodium tetraborate decahydrate, dipotassium tetraborate tetrahydrate, potassium pentaborate tetrahydrate, disodium or dipotassium octaborate tetrahydrate, an aqueous solution of boric acid and sodium or potassium hydroxide and mixtures thereof with a substantially oxygen free aqueous solvent containing one or more metal salts; combining one or more water-soluble polymerizable vinyl monomers with the resultant buffer-salt solution; and combining a free radical polymerization initiator with the resultant monomer-buffer-salt solution to cause the polymerization of the monomers and the formation of a viscous aqueous polymer solution.

Viscous aqueous solutions containing organic polymers have been utilized heretofore for carrying out a variety of treatments in subterranean hydrocarbon-containing formations to increase the production of hydrocarbons therefrom. For example, in the production of oil and gas wells which also produce large volumes of salt water, the cost of producing the salt water, separating it from produced oil and gas and disposing of the salt water represents an economic loss in the operation of the wells. In order to reduce the production of salt water from such wells, viscous aqueous polymer solutions have heretofore been utilized to preferentially reduce water production from portions of the producing subterranean formations. The high molecular weight polymers or copolymers in the aqueous polymer solution plug the pores of the portions of the formation producing water and thereby substantially reduce the permeability of such portions whereby water production is also substantially reduced.

Viscous aqueous polymer solutions have also been utilized heretofore in processes for enhancing the recovery of oil from subterranean oil-containing formations. In such processes, the viscous aqueous polymer solution is injected into the formation by way of at least one injection well penetrating the formation and forced through the formation towards at least one production well penetrating the formation whereby the production of oil from the formation is increased. Such processes are usually carried out in subterranean oil-containing formations after primary recovery operations are completed, but they can also be utilized during and as a part of primary recovery operations. In the usual case, during primary recovery operations, the energy required to force oil into producing wells is supplied by the natural pressure drive existing in the formation or by mechanically lifting oil from the formation through the well bores of producing wells to the surface. At the end of primary recovery operations, a substantial quantity of oil often remains in the formation.

In enhanced recovery operations, energy for producing oil remaining in a subterranean oil-containing formation is supplied by injecting liquids or gases through one or more injection wells penetrating the formation into the formation under pressure whereby the liquids or gases drive the oil to producing wells penetrating the formation. The most common of such recovery techniques is known as water flooding wherein an aqueous liquid is injected into formation under pressure which provides the energy and flushing action necessary to force oil in the formation to one or more production wells penetrating the formation. The efficiency of such water flooding techniques varies greatly depending upon a number of factors including variability in the permeability of the formation and the viscosity of the oil remaining in the formation. When the oil remaining in the formation is of a relatively high viscosity, aqueous flooding media of low viscosity such as fresh water on brine tends to finger through the high viscosity oil front and thereby bypass most of the available oil. In addition, typical subterranean formations contain layers of materials which often have widely varying permeabilities to liquid flow. Consequenty, the aqueous flood medium tends to follow the course of least resistance, i.e., flow through zones of high permeability in the formation and thereby bypass zones of less permeability containing oil.

In order to overcome such problems, flooding media having viscosities in the order of or greater than the viscosities of oils to be displaced have been utilized. Generally, the viscosity of the water-flooding medium is increased to a level at which it is close to the viscosity of the oil to be displaced, preferably equal to or greater than the viscosity of the oil to be displaced. This causes the relative flow rates of the oil and the flooding medium in the formation to be comparable and the tendency of the flooding medium to finger through the oil front or bypass oil-containing portions of the formation is substantially diminished.

Solid water-soluble organic polymers have been commonly utilized heretofore for increasing the viscosity of aqueous well treating and injection solutions. Generally, the water-soluble organic polymers are dissolved in the aqueous treating or injection solution at the site, either continuously or on a periodic basis. The dissolution of solid organic polymers in aqueous solutions is difficult, time-consuming and requires special mixing equipment. In addition, the use of solid organic polymers to increase the viscosity of aqueous well treating or injection solutions has been found to involve a number of problems. In the manufacture of high molecular weight linear polymers in solid form, the polymers are formed in a solvent, usually water, and the solvent is then removed. The removal of the solvent such as by evaporation often causes undesirable cross-linking of some of the polymers. The polymer cross-linking forms insoluble particles that swell when contacted with water to form gels, commonly called microgels. Because of the presence of such microgels in aqueous polymer well treating and injection solutions used in well treatment and enhanced oil recovery processes, the solutions tend to plug the formation into which they are injected. The removal of the solvent also promotes hydrolysis which can lead to incompatibility of the polymer with some brines.

The manufacturing process of solid polymer also involves particulating the polymer after removal of the solvent. The particulation of the solid polymer causes the degradation thereof, i.e., the long chain polymers are sheared whereby the molecular weights thereof are reduced and individual polymers of varying chain length and molecular weight are formed. Thus, accurate control of polymer chain length and molecular weight is not possible when solid polymers are used.

Emulsion polymer liquids (polymers dissolved in water which is in turn dispersed as droplets in oil) have also been utilized heretofore for forming aqueous well treating and injection solutions. As in the case of solid polymers, the use of emulsion polymers involves special mixing equipment and is time-consuming. Also, surfactants must be utilized to cause the emulsion to invert and the presence of oil in the resultant aqueous polymer solution can be detrimental.

By the present invention methods of preparing viscous aqueous organic polymer solutions for use in treating subterranean hydrocarbon-containing formations and for use in carrying out enhanced oil recovery processes in oil-containing formations are provided whereby the organic polymers are formed in aqueous solutions at the sites of use of the solutions. The formation of the polymers in an aqueous solution at or near the location of their use avoids the problems mentioned above relating to the use of solid polymers. Further, the methods of the present invention whereby the polymers are prepared in solution at the job site avoids the expense associated with producing the polymers in solid or liquid form and the time and expense involved in dissolving the polymers in an aqueous solution at the job site. Improved methods and systems for enhancing the recovery of oil from subterranean oil-containing formations using such aqueous polymer solutions are also provided by the present invention.

In accordance with the methods of the present invention, a viscous aqueous organic polymer solution for treating subterranean hydrocarbon-containing formations is prepared at the site where the solution is to be used by polymerizing one or more vinyl monomers in an aqueous polymer solvent solution. The resulting viscous polymer treating solution is utilized to treat a subterranean hydrocarbon-containing formation to enhance the recovery of hydrocarbons therefrom, e.g., the polymer solution is used for reducing water production from portions of the formation, for forming fractures therein or for carrying out other procedures for stimulating the production of hydrocarbons from the formation. The viscous aqueous polymer solution produced is also particularly suitable for use in enhanced oil recovery processes wherein a viscous aqueous solution is injected into a subterranean oil-containing formation by way of at least one injection well penetrating the formation and forced through the formation towards at least one production well penetrating the formation.

In the accompanying drawing forming a part of this disclosure, a system for carrying out the methods of the present invention is illustrated.

In one embodiment of the method of the present invention for preparing a viscous aqueous polymer solution, one or more water soluble polymerizable vinyl monomers selected from the group consisting of acrylamide monomers alone and acrylamide monomers and one or more other vinyl monomers which are copolymerizable therewith are combined with an aqueous inorganic salt solution. The salt solution contains one or more metal salts of strong inorganic acids at a high concentration, e.g., at least about 12% by weight of the salt solution. A water-soluble ionizing sulfite is then combined with the aqueous monomer-salt solution whereby the rapid polymerization of the monomers takes place and a viscous aqueous polymer solution is formed.

As is well understood by those skilled in the art, the presence of dissolved oxygen in an aqueous medium in which vinyl monomers of the type described above are polymerized normally either prevents the polymerization reaction from taking place or interferes with the reaction so that long chain high molecular weight polymers are not formed. When an aqueous salt solution is utilized as the aqueous medium for the polymerization reaction, because of the presence of the salt or salts in the solution, less dissolved oxygen is present therein. In addition, when an ionizing sulfite is combined with the salt solution containing vinyl monomers in accordance with the method of this invention, the combination of salt, sulfite and oxygen remaining in the solution causes the initiation of the polymerization reaction without the necessity of carrying out special procedures for the removal of oxygen or adding a separate free radical polymerization initiator to the solution. It is believed that the sulfite functions to reduce the dissolved oxygen content of the salt solution to a level whereby the polymerization reaction can proceed normally and the polymerization reaction is initiated by remaining dissolved oxygen and/or unreacted sulfite.

The aqueous salt solution utilized preferably contains one or more monovalent salts such as sodium chloride, and the vinyl monomers utilized are preferably acrylamide alone which forms polyacrylamide or acrylamide and acrylic acid which form copolymers thereof. The water-soluble ionizing sulfite utilized can be a sulfite selected from the group consisting of alkali metal, ammonium and substituted ammonium sulfites, bisulfites, pyrosulfites, metasulfites and mixtures thereof. Of these, sodium sulfite is preferred.

This embodiment of the method of the present invention for the on-site preparation of a viscous aqueous polymer solution is advantageous in that a separate free radical polymerization initiator is not required and special steps for excluding dissolved oxygen from the solution need not be carried out. The viscous aqueous polymer solution can be used directly in the treatment of subterranean hydrocarbon-containing formations or it can be diluted with additional aqueous medium to produce an aqueous polymer solution of desired lower viscosity.

In an alternate more preferred method of the present invention for the on-site preparation of a viscous aqueous polymer solution, one or more vinyl monomers are polymerized in an aqueous solvent which may contain a high concentration of one or more salts. Dissolved oxygen is preferably removed from the aqueous solvent by purging the solvent with an inert gas and the polymerization reaction is initiated by a free radical polymerization initiator.

Vinyl monomers which are suitable for use in accordance with the method of the invention whereby polymers or copolymers are formed therefrom are monomers and mixtures of monomers having the general formula:

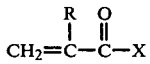

wherein:
R is hydrogen or —CH$_3$;

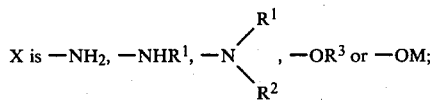

R$^1$ is an alkyl radical having in the range of from 1 to 4 carbon atoms or R$^1$ is R$^4$—Y;
R$^2$ is an alkyl radical having in the range of from 1 to 3 carbon atoms;
R$^3$ is an alkyl radical having in the range of from 1 to 3 carbon atoms;
R$^4$ is an alkyl radical having in the range of from 1 to 4 carbon atoms;
Y is —SO$_3$H, —CO$_2$H, —SO$_3$M or —CO$_2$M; and
M is a metal selected from Group IA of the Periodic Table of the Elements.

When the above described monomers are formed in water containing more than about 1000 ppm divalent metal ions or when the aqueous polymer solution formed is diluted or mixed with diluting water or formation water containing more than about 1000 ppm divalent metal ions, it is preferred that the monomer or monomers used do not contain the radicals —OM, CO$_2$H or CO$_2$M.

Vinyl monomers which are preferred for use in accordance with this method are monomers and mixtures of monomers having the formula:

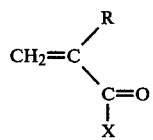

wherein:
R is hydrogen or —CH$_3$;

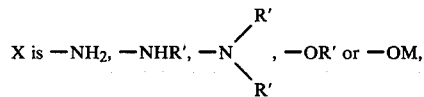

with the restriction that when divalent metal ions are present in the aqueous solvent in which the monomers are polymerized, X is not —OM;
Each R' is independently an alkyl radical having in the range of from 1 to 4 carbon atoms; and
M is hydrogen or a metal from Group IA of the Periodic Table of the Elements.

Examples of preferred monomers as defined above are acrylamide, N-methylacrylamide, N,N-dimethylacrylamide, N-ethylacrylamide, acrylic acid, sodium acrylate, potassium acrylate, lithium acrylate, methyl acrylate, ethyl acrylate, methacrylic acid, sodium methacrylate, potassium methacrylate, methyl methacrylate and 2-acrylamido-2-methypropanesulfonic acid and sodium, lithium and potassium salts thereof.

In carrying out this method, the monomers used are combined with an aqueous solution which can contain one or more salts. The salts contained in the aqueous solvent can be monovalent salts of strong inorganic acids such as sodium chloride, potassium chloride and sodium sulfate. Multivalent metal salts such as calcium chloride and magnesium chloride can also be present, either alone or in combination with monovalent metal salts. The concentration of such salt or salts in the aqueous solution can be as high as saturation.

The vinyl monomers utilized are combined with the aqueous solvent followed by a free radical polymerization initiator which brings about the rapid polymerization of the monomers. While various free radical polymerization initiators can be utilized, preferred such initiators are selected from the group consisting of sodium persulfate, potassium persulfate, ammonium persulfate, benzoyl peroxide and 2,2'-azobis(isobutyronitrile).

As mentioned above, in a preferred form of this method, dissolved air is removed from the aqueous solution in which the monomer or monomers are polymerized and the solution is agitated and mixed by continuously purging the solution with an inert gas such as nitrogen prior to and during the polymerization reaction. However, as will be understood, other techniques of removing oxygen from the aqueous solution can be employed such as combining oxygen scavenging chemicals with the solution.

The methods of this invention are particularly advantageous in the preparation of viscous aqueous polymer solutions utilized in the treatment of subterranean hydrocarbon-containing formations and in carrying out enhanced oil recovery techniques in that the polymers produced in the aqueous solutions are not cross-linked whereby microgels form in the solutions and the polymer solutions have improved viscosity, i.e., the solutions formed in accordance with the methods can exhibit higher viscosities than solutions formed by dissolving solid or emulsion polymers in an aqueous medium. In addition, the polymers formed in accordance with the above-described methods have a low degree of hydrolysis which results in an improved compatibility with divalent metal cations contained in formation waters and oil field brines as well as with additives commonly utilized in subterranean formation treating solutions such as polycationic organic polymer clay stabilizers, etc.

Hydrolysis is the conversion of amide groups in the polymers to carboxylate groups as represented by the equation:

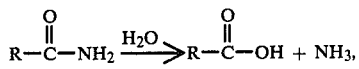

or the conversion of ester groups to carboxylate groups as represented by the equation:

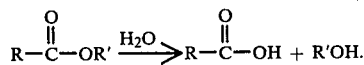

Hydrolysis of solid acrylamide polymers occurs during the drying and grinding operations. In addition, the conversion of amide groups to carboxylate groups occurs more rapidly in aqueous solutions of high pH and the conversion of ester groups takes place more rapidly in aqueous solutions which are strongly acidic or alkaline as compared to neutral aqueous solutions.

When the polymers used to form aqueous polymer solutions are hydrolyzed the carboxyl groups ($CO_2H$ or $CO_2^-$) in the polymers interact with divalent metal ions in the aqueous solution, or when the aqueous solution in which the polymers are dissolved does not contain divalent metal ions, the hydrolyzed polymers can interact with divalent metal ions contained in aqueous dilution solutions used or in formation brines contacted by the polymer solution. The interaction between hydrolyzed polymers and divalent metal ions forms poorly soluble species which often precipitate. The formation of solid particles in polymer solutions utilized to treat subterranean formations is extremely undesirable in that such solid particles can rapidly plug the pores of the formation whereby the injection of the solution into the formation is difficult or impossible and oil recovery from the formation is reduced. Once plugging of the formation pore spaces occurs, remedial measures which must be taken to open up the pore spaces are expensive and time-consuming. In some cases, the solid particles can be filtered out of a polymer solution before it is injected into a subterranean formation, but filtration of solids from viscous polymer solutions is difficult and time-consuming. In addition, filtration of such solutions can cause degradation of the polymers and reduce the viscosity of the solution.

However, when the aqueous solutions used to form and dilute polymer solutions and when formation waters contacted by the polymer solutions are of low salinity, i.e., such aqueous solutions and waters contain less than about 1000 ppm divalent metal ions, some polymer hydrolysis is desirable. In substantially fresh water, partially hydrolyzed polyacrylamide forms a more viscous solution than the same concentration of a non-hydrolyzed polyacrylamide of the same molecular weight. In addition, partially hydrolyzed polyacrylamide is not adsorbed on clays and sandstone as much as non-hydrolyzed polyacrylamide, and consequently, more polymer remains in solution in a formation containing clays and sandstone resulting in a more viscous solution and more oil recovery and/or less polymer being required.

By the methods of the present invention wherein the polymerization of monomers is carried out in an aqueous solution at or near the location of use of the resulting polymer solution, the degree of hydrolysis of the polymers formed is determined by the pH of the aqueous solution and/or other variables in accordance with the salinity of the aqueous solutions or brines utilized and/or to be contacted and other conditions relating to the particular application of the polymer solution whereby optimum results are achieved. Of particular advantage is the fact that the polymers can be formed with a low degree of hydrolysis whereby the precipitation of insoluble solids is substantially prevented and the polymers are not otherwise adversely affected by the presence of divalent or polyvalent metal cations in the solutions. Thus, oil field brines which are generally readily available in oil fields can be utilized as the solution in which the monomers are polymerized to form the viscous polymer solutions and as diluents for the solutions. Further, in offshore locations sea water can be utilized as the polymerization solvent and diluent. The term "oil field brine" is used herein to mean the saline water produced from subterranean formations containing metal salts and having high ionic strengths.

The most preferred vinyl monomers for use in carrying out the methods of this invention of preparing viscous aqueous polymer solutions are acrylamide monomers alone whereby polyacrylamides are formed, and where the aqueous solution in which the polymerization reaction is carried out is of low divalent metal ion concentration, acrylamide and acrylic acid monomers whereby copolymers or acrylamide and acrylic acid are formed.

As will be understood, the quantity of monomers combined with a particular quantity of aqueous solvent determines the concentration of polymers in the solution and resultant viscosity thereof. Also, increasing the quantity of monomer with all other variables held constant brings about the production of polymers of higher average molecular weight. In the on-site preparation of viscous aqueous organic polymer solutions for treating subterranean hydrocarbon-containing formations, it is economically advantageous to prepare a concentrated polymer solution which is then diluted with additional brine or water to produce an aqueous polymer injection solution of desired viscosity. However, the concentration of the aqueous polymer solution is limited by the desired chain length of the polymers produced. For example, in subterranean formations of low permeability having relatively small pores, a smaller polymer chain length and molecular weight is generally required to achieve the desired result as compared to a highly permeable formation having large pores.

Generally, in carrying out the methods of the present invention, the monomers are combined with the aqueous solvent in an amount in the range of from about 1% to about 10% by weight of the resulting solution. When a water ionizing sulfite is utilized to initiate the polymerization reaction, it is combined with the monomer-salt solution in an amount in the range of from about 0.001% to about 0.1% by weight of the resulting sulfite-monomer-salt solution. When a free radical polymerization initiator of the type described above is utilized to initiate the polymerization reaction, it is combined with the monomer solution in an amount in the range of from about 0.001% to about 0.1% by weight of the resulting initiator-monomer solution.

While both the methods of preparing viscous aqueous polymer solutions described above can be carried out in aqueous solvent solutions at various pH levels, the rate of the polymerization reaction can be accelerated by controlling the pH of the solutions. When an ionizing sulfite is utilized for preparing the polymer solution, the polymerization reaction proceeds at its most rapid rate at a solvent pH of about 7.2. When a free radical polymerization initiator such as sodium persulfate is utilized to initiate the polymerization reaction, the reaction proceeds rapidly at a solvent pH in the range of from about 3 to about 10.0. However, as described above, depending upon the desired degree of polymer hydrolysis and the divalent metal ion concentration of the aqueous solvent and other solutions utilized, aqueous solvents of varying specific pH are utilized. In most cases where oil field brines are used, the pH of the aqueous polymer solvent is adjusted to a level in the range of from about 7 to about 8.5 utilizing a buffer or buffer system. While a variety of compounds which function as buffers can be used, many cause the precipitation of metal ions contained in the aqueous solution. A particularly suitable buffer which does not cause such precipitation is a buffer selected from the group consisting of sodium and potassium tetraborate, sodium, potassium and lithium tetraborate pentahydrate, sodium, potassium and lithium tetraborate decahydrate, dipotassium tetraborate, tetrahydrate, potassium pentaborate tetrahydrate disodium or dipotassium octaborate tetrahydrate, an aqueous solution of boric acid and sodium or potassium hydroxide and mixtures thereof. Of these, an aqueous solution of boric acid and sodium hydroxide is preferred.

In order to control the average molecular weight of the polymers produced, as well as the viscosity of the resulting solution, a chain transfer agent such as one selected from the group consisting of triethanolamine, butyl alcohol, isopropyl alcohol and mixtures thereof can be combined with the aqueous solvent solution. The addition of such a chain transfer agent can increase the polymerization reaction rate and lowers the average molecular weight of the polymers produced as well as the viscosity of the resultant polymer solution. Of the various chain transfer agents which can be used, triethanolamine which increases the polymerization reaction rate is preferred. The average molecular weight of the polymers produced is also controlled by varying the quantity of polymerization initiator utilized. Generally, increases in the quantity of initiator utilized increases the reaction rate and lowers the polymer average molecular weight. Thus, by varying the quantities and types of initiator and chain transfer agent used, the average molecular weight of the polymers produced can be varied. As mentioned above, the particular average molecular weight desired depends on various factors such as the permeability of the formation to be treated, the viscosity of the oil to be recovered, etc.

Other additives such as biocides, surfactants and clay stabilizers can be combined with the aqueous polymer solution before or after the polymerization reaction is carried out therein.

Improved methods and systems shown in the drawing and more fully described hereinafter were invented by Hugh Ayres, John Diller and James Glenn for carrying out enhanced oil recovery techniques in subterranean oil-containing formations wherein viscous aqueous polymer solutions are prepared from monomer starting materials at the site using readily available fresh water, salt water, oil field brines or sea water are provided. In accordance with such methods, a concentrated viscous aqueous polymer solution is prepared which is then diluted with additional fresh water, oil field brine or sea water to form a polymer solution of desired viscosity and other properties. The diluted polymer solution is injected into a subterranean formation by way of at least one injection well penetrating the formation whereby oil contained in the formation is driven towards at least one production well penetrating the formation.

Referring now to the accompanying drawing, one system for carrying out the improved methods of this invention is illustrated and generally designated by the numeral 10.

The system 10 is comprised of at least one polymerization reaction vessel 12 having a monomer and other chemicals and additives inlet 14, an aqueous solvent solution inlet 16 and a viscous aqueous polymer solution outlet 18. When an inert gas is utilized for mixing and purging the aqueous solution and rmeoving dissolved oxygen therefrom, the reaction vessel 12 includes an inert gas inlet 20 and a purge gas outlet 22. Other mixing means can be utilized such as mechanical stirrers, circulation apparatus, including pumps, etc.

A conduit 24 is connected to the aqueous solvent solution inlet 16 of the vessel 12 which conducts an aqueous solvent solution from a source thereof to the vessel 12. A conduit 26 connected to the inlet connection 14 of the vessel 12 leads monomers and other chemicals and additives to the vessel 12. When inert gas is utilized to mix and purge the aqueous solution, a conduit 28 connected to the inlet connection 20 of the vessel 12 leads a stream of inert gas thereto and a conduit 30 connected to the purge gas outlet connection 22 of the vessel 12 leads purge gas to the atmosphere or other location.

The concentrated viscous aqueous polymer solution prepared in the vessel 12 is withdrawn theefrom by way of a conduit 32 connected to the polymer solution outlet 18 thereof. The conduit 32 leads a stream of the polymer solution to the suction connection of a polymer solution pump 34. Depending upon the viscosity of the concentrated polymer solution and other factors which will be described further hereinbelow, a polymer solution booster pump 33, a mixing apparatus 50 such as an in-line mixer and one or more dilution tanks 36 can be disposed in and connected to the conduit 32. A portion of the aqueous solution flowing to the reaction vessel 12 by way of the conduit 24 can be conducted to the dilution tank or tanks 36 by a conduit 38 connected thereto and to the conduit 24.

An injection pump 40 is provided and a conduit 42 is connected between the suction connection of the injection pump 40 and a source of an aqueous diluent. The discharge connection of the injection pump 40 is connected by a conduit 44 to one or more injection wells 46 penetrating a subterranean oil-containing formation. A conduit 48 is conenctcd to the discharge connection of the polymer solution pump 34 and to the conduit 44. A mixing apparatus 51 such as an in-line mixer is optionally disposed in the conduit 44 downstream of the connection between the conduit 44 and the conduit 48. Thus, the concentrated viscous aqueous polymer solution formed in the polymerization reaction vessel 12 and optionally diluted in the dilution tank or tanks 36 is combined with an aqueous diluent in the conduit 44 and optionally in the mixer 51. The resultant aqueous injection solution is conducted to the injection well 46 by the conduit 44. As shown on the drawing, if one or more dilution tanks 36 are utilized in the system 10, the dilution can optionally be carried out with a portion of the aqueous solution pumped by the injection pump 40, i.e., a portion of the aqueous solution can be conducted from the conduit 44 to the conduit 38 by a conduit 39. Further, as shown on the drawing, if it is advantageous to combine the concentrated polymer solution or preliminarily diluted solution pumped by the pump 34 with the aqueous diluent upstream of the injection pump 40 whereby the mixing thereof is supplemented by the pump 40, the aqueous polymer solution can be conducted to the suction of the pump 40 by a conduit 41 connected between the conduits 48 and 42. In order to provide the above described flexibility the system 10 can include the conduits 39 and 41 and appropriate valves and/or controls (not shown).

The system 10 as illustrated in the drawing utilizes oil field brine for the aqueous solvent solution for the polymerization reaction in the polymerization reaction vessel 12, for the dilution tank 36 and for the aqueous diluent flowing to the injection pump 40. In addition, at least a portion of the oil field brine utilized in the system 10 is produced by one or more production wells 52 which penetrate the subterranean oil-containing formation also penetrated by the injection well or wells 46.

In the system 10, produced brine is led from separation apparatus 53 connected to the production well or wells 52 by a conduit 54 to the inlet connection 56 of one or more brine storage tanks 58. The brine storage tank or tanks 58 include a brine outlet connection 60 and a makeup brine inlet connection 62. A conduit 64 connected to the inlet connection 62 leads makeup brine from a source thereof to the storage tank or tanks 58 and the conduit 42 connected to the suction connection of the injection pump 40 is connected to the brine outlet connection 60 of the tank or tanks 58. The conduit 24 which leads the aqueous solvent solution to the polyemrization reaction vesel 12 is connected to the conduit 44 whereby a portion of the brine pumped from the storage tank or tanks 58 by the pump 44 is led to the vessel 12. Depending upon the composition of the particular brine utilized in the system 10, brine treatment apparatus 66 and a booster pump 67 are disposed in and connected to the conduit 24.

In carrying out the methods of the present invention using the system 10, an aqueous salt solution, ie., oil field brine, is conducted by way of the conduit 24 to the reaction vessel 12. If such brine includes components which interfere or adversely affect the polymerization reaction in the vessel 23, the brine treatment apparatus 66 is utilized to remove such components. For example, hydrogen sulfide, ammonium ions and ferrous ions all adversely affect the polymerization of vinyl monomers in an aqueous solution. Depending upon the particular components contained in the brine which adversely affect the poymerization reaction, appropriate treatment apparatus 66 for the removal thereof is included in the system 10.

The monomer or monomers, buffers, water ionizing sulfites, free radical polymerization initiators, chain transfer agents and other chemicals utilized are conducted to the vessel 12 by way of the conduit 26 connected thereto. Inert gas is led to the vessel 12 by the conduit 28 and purge gas containing removed dissolved oxygen is withdrawn from the vessel 12 by way of the conduit 30.

The polymerization of the monomers utilized in the aqueous solvent solution is carried out within the vessel 12 and a stream of the resultant concentrated viscous aqueous polymer solution formed in the vessel 12 is withdrawn therefrom by the conduit 32. As will be understood by those skilled in the art, more than one polymerization reaction vessel 12 can be utilized in conjunction with switching valves and additional conduits whereby a continuous stream of the aqueous polymer solution is withdrawn from the vessels 12. That is, polymer solution can be withdrawn from one reaction vessel 12 while the polymerization reaction is carried out in another reaction vessel 12. When all of the polymer solution has been withdrawn from the first reaction vessel, the reaction vessels are switched whereby polymer solution is withdrawn from the second reaction vessel while additional polymer solution is formed in the first reaction vessel.

In applications where it is desirable or necessary to prelimiarily dilute the viscous aqueous polymer solution formed in the vessel 12 to reduce the viscosity of the solution whereby it is readily mixable with the aqueous diluent pumped by the injection pump 40, one or more dilution tanks 36 can be connected in and to the conduit 32 and brine for diluting the polymer solution can be conducted to the solution tank or tanks 36 either by the conduit 38 which conducts treated brine to the dilution tanks 36 when brine treatment apparatus is included in the system 10, or by the conduit 39 which conducts untreated brine to the dilution tank or tanks 36. In addition, two or more dilution tanks 36 can be utilized in conjunction with switching valves and additional conduits to produce a continuous stream of initially diluted viscous aqueous polymer solution rather than utilizing two or more reaction vessels 12. In either event, a continuous stream of aqueous polymer solution is withdrawn from the reaction vessel or vessels 12 or from the dilution tank or tanks 36 and pumped into the conduit 44 by the polymer solution pump 34. When the aqueous polymer solution from the reaction vessel or vessels 12 is highly viscous, the booster pump and mixer 50 are utilized upstream of the dilution tank or tanks 36.

The injection pump 40 pumps a continuous stream of brine into the conduit 44 and the conduit 24 connected to the conduit 44 leads a side stream of the brine to the brine treatment apparatus 66, if used, and to the reaction vessel or vessels 12. The stream of brine flowing through the conduit 44 combines with the polymer solution pumped by the pump 34 and conducted to the conduit 44 by the conduit 48. As the mixture flows through the conduit 44 and while flowing through the mixer apparatus 50, if sued, the combined mixture is thoroughly mixed and the resulting diluted polymer solution having a desired viscosity and other properties is conducted by the conduit 44 to the injection well or wells 46.

The aqueous polymer solution injected into the subterranean oil-containing formation penetrated by the injection well or wells 46 is forced through the formation towards the production well or wells 52. The aqueous polymer solution in turn forces oil contained in the formation towards the production wells 52 in a manner well known by those skilled in the art.

Oil, gas and brine produced by the production well or wells 52 is routed to the cnventional separation apapratus 53 wherein produced brine is separated from the produced oil and gas. The produced brine is conducted by the conduit 54 connected to the separation apapratus 53 to the inlet connection 56 of the brine storage tank or tanks 58 as described above.

As will be understood by those skilled in the art, instead of using oil field brine and/or brine producing frm the production well or wells 52 as the aqueous solvent solution in which the polymerization reaction is carried out in the reaction vessel or vessels 12 and as the aqueous diluents for the concentrated viscous aqueous polymer solution produced, fresh water and/or aqueous salt solutions from other sources can be used.

When the viscous aqueous polymer solution formed in the reaction vessel or vessel 12 is diluted with an aqueous salt solution from the same source as the aqueous salt solution utilized in forming the polymer solution in the vessel or vessels 12, a higher viscosity often results than is the case when the aqueous polymer solution is diluted with an aqueous diluent from a different source, all other conditions being the same. For example, when oil field brine is utilized as the aqueous solvent solution in which the polymers are formed as well as the aqueous diluent for the polymer solution formed, a diluted solution of higher viscosity is generally obtained as compared to the case where brine is used as the polymerization solvent and the aqueous diluent is fresh water. In addition, it has been by inventor Jimmie D. Weaver that when the aqueous solvent solution utilized in the polymerization reaction vessel or vessels 12 and the aqueous diluents are saline solutions, if the aqueous polymer solvent solution is of a higher total salt concentration than the diluents, the rate of dilution or ease of dilution of the polymer solution is increased.

As will also be well understood, depending upon the particular sources of the aqueous solution utilized as the polymerization reaction solvent and of the aqueous diluent or diluents used as well as other factors, more or less apparatus than that illustrated in the drawing and described above can be used. For example, when the characteristics of the subterranean formation from which the recovery of oil is enhanced are such that a polymer solution containing polymers of extra-long chain lengths and high molecular weights are required and are formed in the vessel or vessels 12 whereby the resulting aqueous polymer solution has a very high viscosity, the dilution tank or tanks 36 and an intermediate dilution step is usually required. On the other hand, if the aqueous polymer solution formed in the vessel or vessels 12 includes relatively short chain length polymers and the viscosity of the solution is such that the solution is readily pumpable and mixable with an aqueous diluent, the dilution tanks and intermediate dilution step as well as the booster pump 33 and mixer 50 may be omitted. Also, depending upon the sources of the aqueous solvent solution and the aqueous diluent of diluents, the brine storage tank or tanks 36 and/or the treatment apparatus 66 may or may not be utilized. Other arrangements of pumps, conduits and control apparatus will readily suggest themselves to those skilled in the art. In addition, the various vessels, tanks, pumps, treatment apparatus and other components of the system 10 can be trailer mounted for ease of assembly and movement to and from field locations as well as between locations or injection well sites.

As mentioned above, the particular characteristics of the subterranean formations to be treated using the viscous aqueous polymer solutions of this invention dictate the polymer concentration, polymer chain length and molecular weight, viscosity and other properties of the solutions. That is, in carrying out the methods of this invention for enhancing the recovery of oil from subterranean oil-containing formatins, formation characteristics such as porosity, size of pores, viscosity of the oil to be produced, etc., are used to design a viscous aqueous polymer injection solution which will achieve desired results.

In a typical procedure for designing an enhanced oil recovery process using the methods and system of the present invention, the following information is obtained and determinations made relating to the formation or reservoir from which oil is to be produced and the optimum flood polymer solution and system to be used:

RESERVOIR PROPERTIES

Productive acres of field
Reservoir volume (acre-feet)
Reservoir volume under producing leases owned by the operator in question (acre-feet)
Number of producing wells
Reservoir area per producing well (acres)
Average thickness of productive formation (feet)
Average Porosity (%)
Average permeability (darcies)
Average water saturation (%)
Average volume factor
Reservoir temperature (°F. or °C.)

In addition, an isopach map of the field is most valuable in designing proper siting of injection wells and any additional production wells. An isopach map also aids in determining the daily injection volume for each well. This volume is chosen so the flood front and oil bank approach each production well properly without being diverted away due to pressures caused by injection of improper fluid volumes into other injection wells.

Using the above data and the production history of the reservoir the following may be calculated:
Original Oil in Place (OOIP), bbl/acre ft.
Original Oil in Place—Total reservoir bbl
Original Oil in Place—Lease owned by operator in question—bbl
Estimated Ultimate Primary Recovery (%OOIP)
Estimated Ultimate Primary Recovery—bbl/acre ft.
Estimated Ultimate Primary Recovery—bbl
Cumulative Primary Recovery to date—bbl
Cumulative Primary Recovery to date—bbl/acre ft.
Remaining Primary Reserves as of date of analysis—bbl
Remaining Primary Reserves as of date of analysis—bbl/acre ft.

A volumetric calculation may be made to estimate the amount of oil which will be recovered by water flooding (usually in progress while a polymer flood is being designed).

$$N_2 = 7758\phi \left[ \frac{1 - S_w}{B_{oi}} - \frac{S_{or}}{B_o} \right] - N_p$$

wherein:

$N_2$ = theoretical recoverable oil (bbl/acre ft)
$\phi$ = porosity (%)
$S_w$ = interstitial water saturation
$S_{or}$ = residual oil saturation
$B_{oi}$ = initial volume factor
$B_o$ = current volume factor
$N_p$ = cumulative oil produced (bbl/acre ft)

The number calculated must be reduced by the amount of remaining primary reserves. This gives the total oil theoretically recovered by a 100% efficient water flood. The amount actually available for recovery is much less and may be determined by multiplying the theoretical value by a percent efficiency of the water flood. This efficiency may be determined from extrapolation of production decline curves or the experience of other operators in the area.

The oil remaining available to be produced using enhanced oil recovery methods (i.e., a polymer flood) can then be determined:

$$EOR_{oil} = OOIP - COPP - COWF - RRPP - RRWF$$

wherein:
OOIP = oil originally in place—bbl
COPP = cumulative oil produced by primary production—bbl
COWF = cumulative oil produced by water flood—bbl
RRPP = remaining reserves recoverable by primary production—bbl
RRWF = remaining reserves recoverable by water flood—bbl

FLUID PROPERTIES—OIL

Viscosity under reservoir conditions
Compatibility with candidate flood chemicals

FLUID PROPERTIES—WATER

Formation Water
Analysis for all ions present to determine compatibility with candidate flood chemicals.
Injection Water
Analysis for all ions present to determine compatibility with candidate flood chemicals.

Other information is also desirable: core analysis to determine possible requirements for clay stabilization, asphaltene and paraffin analysis of the oil to determine if treatment of production wells to remove hydrocarbon deposits plugging the formation are or will be required, and injection profiles of the injection well sand production history of the producing wells to determine if thief zones need to be plugged and methods instituted to control water and sand production.

Using this information, a polymer system can be designed to give a favorable mobility ratio and compatibility with all reservoir fluids. Laboratory oil recovery and injectivity tests are then performed. These experiments are best carried out using actual injection water, formation water, oil, and representative samples of formation core. The resistance factor, residual resistance factor, and polymer adsorption (on the core material) may be determined. The need for any water treatment to remove polymerization inhibitors from the water used in flood polymer manufacture is determined. For example, although hydrogen sulfide may be present in dilution water, it must be removed from the water used in the polymerization reaction itself.

With this information, the optimum flood polymer and polymer concentration may be chosen. Oil recovery as a function of volume of injected polymer solution can be optimized. The oil which will be produced from the entire reservoir may then be predicted and the following design parameters for the field project may be determined; flood polymer concentration, total polymer required, cost of polymer and services, total additional oil recovered, and cost per bbl of additional oil recovered.

In order to facilitate a clear understanding of the methods of this invention, the following examples are given.

EXAMPLE 1

A number of test aqueous salt solutions containing acrylamide monomer are prepared at various pH levels. Sodium sulfite is combined with the solutions and the polymerization reaction, if any, is noted. When polymerization occurs, the "induction time", i.e., the time interval between when the sodium sulfite is combined and when the solutions reach an apparent viscosity of 100 centipoises is noted as well as the apparent viscosities after 24 hours and 96 hours.

Each of the test solutions is prepared by combining 30 grams of sodium chloride with 100 grams of fresh water. The pH is adjusted to a desired level by adding 0.25 grams of phosphoric acid followed by the amount of trisodium orthophosphate shown in Table I below. 3.0 grams of acrylamide monomer are then combined with the solution followed by 0.12 gram of sodium sulfite. The tests are carried out at 70° F., exposed to the atmosphere and in contact with steel of the type used in oil well tubing. The results of the tests are shown in Table I below.

TABLE I

POLYMERIZATION OF ACRYLAMIDE MONOMERS WITH SODIUM SULFITE[1] IN AQUEOUS SALT SOLUTIONS AT VARIOUS pH LEVELS

| Test No. | Amount of Trisodium Orthophosphate ($Na_3PO_4 \cdot 12H_2O$) Combined with Solution (grams) | pH of Solution | Induction Time, Minutes | Viscosity[2] Centipoises 24 hours | Viscosity[2] Centipoises 96 hours |
|---|---|---|---|---|---|
| 1 | 0 | 1.0 | No polymerization reaction | | |
| 2 | 0.2 | 1.42 | No polymerization reaction | | |
| 3 | 0.4 | 4.42 | No polymerization reaction | | |
| 4 | 0.6 | 5.10 | 120 | 15 | 15 |
| 5 | 0.8 | 5.48 | 7 | 37 | 35 |
| 6 | 0.9 | 5.7 | 5 | 70 | 65 |
| 7 | 1.0 | 5.85 | 4 | 172 | 300 |
| 8 | 1.05 | 6.0 | 3 | 470 | 675 |
| 9 | 1.15 | 6.25 | 4 | 1825 | 1825 |
| 10 | 1.2 | 6.64 | 4 | 8600 | 8100 |
| 11 | 1.25 | 6.85 | 6 | 23,200 | 23,040 |
| 12 | 1.27 | 7.2 | 19 | 208,000 | 102,000 |

[1]Sodium sulfite is 99.5% pure sodium sulfite.
[2]Viscosities are measured on a Brookfield Model LVT viscometer at 20 rpm using Spindle No. 3.

From Table I above it can be seen that the polymerization reaction of acrylamide monomers in an aqueous salt solution which takes place when sodium sulfite is combined therewith is pH sensitive and that the reaction is optimally carried out at a pH of about 7.

EXAMPLE 2

Test aqueous solutions containing acrylamide monomer and various quantities of salt are prepared. Sodium sulfite is combined with the solutions and the polymerization induction times and apparent viscosities after 24 hours are noted. The tests are carried out at 71° F. exposed to the atmosphere and in some of the tests, the solutions are in contact with steel of the type used in oil well tubing.

Each of the test solutions is prepared by combining various quantities of sodium chloride (quantities shown in Table II) with 100 grams of fresh water. 2 grams of sodium bicarbonate (buffer) and 3 grams of acrylamide monomer are combined with the solution followed by 0.012 grams of sodium sulfite. The results of these tests are shown in Table II below.

TABLE II

POLYMERIZATION OF ACRYLAMIDE MONOMERS WITH SODIUM SULFITE IN AQUEOUS SALT SOLUTIONS CONTAINING VARIOUS QUANTITES OF SALT

| Test No. | Quantity of Sodium Chloride in Salt Solution, grams | pH of Solution | Induction Time, Minutes | Viscosity hu 2 After 24 Hours, Centipoises |
|---|---|---|---|---|
| 1 | 15 | 7.52 | No Polymerization Reaction | |
| 2 | 20 | 7.40 | No Polymerization Reaction | |
| 3 | 25 | 7.30 | 30 | 12,500 |
| 4 | 30 | 7.3 | 15 | 6,520 |
| 5 | 35 | 7.2 | 10 | 19,600 |
| 6[1] | 15 | 7.5 | No Polymerization Reaction | |
| 7[1] | 25 | 7.3 | No Polymerization Reaction | |
| 8[1] | 35 | 7.15 | 25 | 208,000 |

[1]Test solutions not in contact with steel.
[2]Viscosities are measured on a Brookfield RVT Viscometer.

From Table II above it can be seen that the concentration of salt in the salt solution is important and that the higher the salt concentration the better the polymerization reaction proceeds. When the solutions are in contact with steel, shorter induction times and lower viscosities are obtained.

EXAMPLE 3

Test aqueous solutions containing acrylamide monomer, sodium chloride and buffer (solution pH of about 7.0 to about 7.3) are prepared. Various quantities of sodium sulfite are combined with the solutions and the induction times and apparent viscosities after 2 hours and 18 hours are noted.

Each of the test solutions are prepared by combining 30 grams of sodium chloride, 2 grams of sodium bicarbonate, 0.5 grams of sodium carbonate, 3 grams of acrylamide monomer and various quantities of sodium sulfite with 100 grams of fresh water. The tests are carried out at various temperatures, exposed to the atmosphere and some of the test solutions are in contact with steel of the type used in oil well tubing. The results of these tests are given in Table III below.

TABLE III

POLYMERIZATION OF ACRYLAMIDE MONOMERS WITH VARIOUS QUANTITIES OF SODIUM SULFITE IN AQUEOUS SALT SOLUTIONS

| Test No. | Temperature, °F. | Quantity of Sodium Sulfite[1] Used, Grams | Solution Exposed to Steel | Induction Time Minutes | Viscosity,[2] Centipoises | |
|---|---|---|---|---|---|---|
| | | | | | 2 hours | 18 hours |
| 1 | 35 | 0.12 | No | 25 | 177,375 | 199,950 |
| 2 | 35 | 0.12 | Yes | 25 | 225,750 | 251,550 |
| 3 | 35 | 0.16 | No | 15 | 151,757 | 167,700 |
| 4 | 35 | 0.16 | Yes | 15 | 132,225 | 138,675 |
| 5 | 70 | 0.10 | No | 7 | 145,125 | 164,475 |
| 6 | 70 | 0.10 | Yes | 7 | 138,675 | 161,250 |
| 7 | 80 | 0.10 | No | 7 | 93,525 | 119,325 |
| 8 | 80 | 0.10 | Yes | 7 | 51,600 | 112,875 |

[1]50% by weight pure $Na_2S_2O_8$ and 50% by weight of a mixture containing 99.5% by weight pure $Na_2S_2O_8$.
[2]Viscosities are measured on a Brookfield RVT Viscometer.

From Table III, it can be seen that the polymerization reaction proceeds effectively over a broad ambient termperature range, that relatively small quantities of sodium sulfite are required and that contact with steel effects the viscosities obtained to varying degrees.

In the following examples three different polymerization procedures are used.

In the first procedure, the following ingredients are mixed in a screw-cap jar:

| Ingredients | Quantity |
|---|---|
| Aqueous Fluid | 300 grams |
| Acrylamide Monomer | 9 grams |
| Potassium Chloride, anhydrous | 6 grams |
| Sodium Bicarbonate, anhydrous | 6 grams |
| Sodium Carbonate, anhydrous | 1.5 grams |

The aqueous fluid is fresh water, saturated (24 weight %) aqueous sodium chloride solution or oil field brine No. 1. The resulting mixture is stirred with a magnetic stirrer and purged with nitrogen gas. The nitrogen gas contains oxygen in an amount of 0.3% by volume. A layer of mineral oil is placed on top of the reaction mixture to limit exposure to atmospheric oxygen. After stirring and purging for 15 minutes, 1.8 cc of an aqueous sodium persulfate solution containing 1% by weight sodium persulfate is injected into the aqueous reaction mixture. The mixture is stirred for another 3 minutes after which the bottle is capped and placed in a 90° F. constant temperature bath for 24 hours.

The second procedure is similar to the first except that the potassium chloride, sodium bicarbonate and sodium carbonate are omitted from the mixture. The pH of the mixture is adjusted to 8 by combining triethanolamine therewith. The aqueous fluid is oil field brine No. 1 or oil field brine No. 2.

The third procedure is similar to the first except that the pH is not adjusted, i.e., potassium chloride, sodium bicarbonate, sodium carbonate or triethanolamine are not added to the mixture. The reaction temperature is 100° F. and the aqueous fluid is fresh water containing 2% to 24% by weight sodium chloride, 2% to 20% by weight calcium chloride, or 5% by weight magnesium sulfate.

The reaction was carried out in a resin kettle equipped with a sintered glass tube used as a nitrogen inlet. A glass rod and teflon stirrer blade connected to an overhead stirrer, a septum used to inject catalyst, a thermometer, and a condenser connected to a bubbler.

In all of the procedures, viscosity values are apparent viscosities determined using a Brookfield Model LVT viscometer.

The analysis of oil field brines Nos. 1 and 2 are given in Table IV below.

TABLE IV
ANALYSIS OF OIL FIELD BRINES

| Component | Brine No. 1 Quantity of Component, milligrams/liter | Brine No. 2 Quantity of Component, milligrams/liter |
|---|---|---|
| $HCO_3$ | 277 | 366 |
| $Cl^{-1}$ | 108,864 | 99,800 |
| $SO_4^{-2}$ | 100 | 347 |
| $Ca^{+2}$ | 8,300 | 10,700 |
| $Mg^{+2}$ | 2,310 | 2,430 |
| $Fe^{+2,+3}$ | 3 | 5 |
| $Na^{+1}$ | 56,868 | 48,200 |
| Specific Gravity | 1.122 | 1.112 |
| pH | 6.4 | 6.3 |
| Total Dissolved Solids (milligrams/liter) | 176,722 | 162,000 |

EXAMPLE 4

Acrylamide monomer is polymerized in an aqueous salt solution containing 24% by weight sodium chloride using the second procedure described above at 75° F. In 10 minutes the reaction mixture is viscous and an exotherm is noted. In 20 minutes the temperature has increased to 90° F. The reaction mixture is allowed to stand overnight after which portions of the mixture are diluted with oil field brine No. 1 to polymer concentrations of 5000 ppm, 2,500 ppm, 1,250 ppm, and 250 ppm. The apparent viscosities of the diluted solutions are determined. All of the diluted solutions are clear with no evidence of precipitate formation. The results of these tests are given in Table V below.

TABLE V
ACRYLAMIDE POLYMERIZATION IN SATURATED (24% BY WEIGHT) AQUEOUS SODIUM CHLORIDE SOLUTION AND DILUTION WITH OIL FIELD BRINE NO. 1

| Test No. | Quantity of Polymer in Dilute Solution Tested, parts per million | Viscosity[1] of Solution Tested, centipoises |
|---|---|---|
| 1 | 5,000 | 194[1] |
| 2 | 5,000 | 120[1] |
| 3 | 5,000 | 115[1] |
| 4 | 2,500 | 27[1] |
| 5 | 1,250 | 6[1] |
| 6 | 250 | 2.3[2] |

[1] Brookfield Viscometer using Spindle No. 1 at 30 rpm.
[2] Brookfield Viscometer using UL adapter at 30 rpm.

As shown in Table V, the polymerization of acrylamide can be carried out in saturated aqueous sodium chloride solutions and diluted with oil field brine No. 1 to obtain a dilute solution of desired viscosity without the formation of precipitate or other adverse result.

EXAMPLE 5

Acrylamide monomer is polymerized in a saturated sodium chloride solution (24% by weight sodium chloride) at 100° F. utilizing the third procedure described above (no pH adjustment). The mixture is reacted for 18 hours after which it is allowed to cool to ambient temperature. Portions of the cooled mixture are diluted to polymer concentrations of 5000 ppm, 2,500 ppm, and 1,250 ppm using additional portions of the 24% by weight aqueous sodium chloride solution. The apparent viscosities of the dilute solutions are then determined. The results of these tests are given in Table VI below. Again, no evidence of precipitate formation is noted in any of the dilute polymer solutions.

TABLE VI
ACRYLAMIDE POLYMERIZATION AND DILUTION IN SATURATED (24% BY WEIGHT) AQUEOUS SODIUM CHLORIDE SOLUTION

| Test No. | Quantity of Polymer in Dilute Solution Tested, parts per million | Viscosity[1] of Solution Tested, centipoises |
|---|---|---|
| 1 | 5,000 | 38 |
| 2 | 2,500 | 7.4 |
| 3 | 1,250 | 5.4 |

[1] Brookfield Viscometer using Spindle No. 1 at 30 rpm.

This Example illustrates that acrylamide polymers formed in aqueous saturated sodium chloride solutions can be diluted with the same saturated aqueous sodium chloride soilution to obtain dilute solutions of desired viscosity without precipitate formation or other adverse results.

EXAMPLE 6

Acrylamide monomer is polymerized in oil field brine No. 1 at 90° F. for 24 hours using the second procedure described above. Portions of the reaction mixture are diluted with oil field brine No. 1 to polymer concentrations of 5000 ppm and 2500 ppm and a portion of the polymer reaction mixture is diluted with fresh water to a polymer concentration of 5000 ppm. The apparent viscosities of the dilute solutions are determined. The results of these tests are shown in Table VII.

TABLE VII
ACRYLAMIDE POLYMERIZATION IN OIL FIELD BRINE NO. 1 AND DILUTION WITH OIL FIELD BRINE NO. 1 AND FRESH WATER

| Test No. | Diluent | Quantity of Polymer in Dilute Solution Tested, parts per million | Viscosity of Solution Tested, centipoises |
|---|---|---|---|
| 1 | Oil Field Brine No. 1 | 5,000 | 8 |
| 2 | Oil Field Brine No. 1 | 5,000 | 10 |
| 3 | Oil Field Brine No. 1 | 5,000 | 8 |
| 4 | Oil Field Brine No. 1 | 2,500 | 5 |
| 5 | Fresh Water | 5,000 | 9 |

[1] Brookfield Viscometer using Spindle No. 1 at 30 rpm.

As shown by Tests 1-3 of Table VII, a 5,000 ppm polyacrylamide solution prepared in oil field brine No. 1 has an average apparent viscosity of 8.7 cp. None of the solutions tested show any sign of precipitation or polymer incompatibility with oil field brine No. 1.

For comparison purposes, a commercial solid 33% hydrolyzed polyacrylamide material is combined with oil field brine No. 1 in an attempt to form a dilute solution containing 5,000 ppm polymer. Despite stirring the mixture for 24 hours, not all of the solid polymer is dissolved. While the polymer solution of the present invention prepared and diluted with oil field brine No. 1 exhibits excellent properties and is particularly suitable for use as a secondary recovery injection fluid, the polymer solution prepared using the commercial solid acrylamide polymer requires filtering before injection in that undissolved solids in the solution will plug the flow channels in a subterranean formation thereby rapidly reducing injectivity. The undissolved commercial polymer rquires dispersal and substantially increases the cost of oil recovery.

As further shown in Table VII (Test No. 5), when the concentrated polymer solution prepared using oil field brine No. 1 is diluted to a polymer concentration of 5,000 ppm using fresh water, an apparent viscosity of 9 cp is obtained. Similar viscosity values (8.7±1.3 cp—average deviation Tests 1-3) are obtained when the concentrated polymer solution is diluted with brine despite the much higher concentration of salt in the diluted solution. This is an unexpected result which would not occur when an aqueous solution of commercial solid polymer is diluted with brine. That is, when diluted with brine a solution of commercial solid polymer would exhibit a much lower viscosity.

EXAMPLE 7

Acrylamide monomer is polymerized in oil field brine No. 2 at ambient temperature using the second procedure described above. Although the combined concentration of divalent metal cations in the brine ($Ca^{+2}$ and $Mg^{+2}$) is greater than 13,000 ppm (1.3% by weight), no sign of precipitate formation or polymer incompatibility can be detected. The polymer concentration before dilution is approximately 3.8% by weight. Portions of the concentrated polymer solution prepared are diluted with additional oil field brine No. 2 to concentrations of 5,000 ppm, 2,500 ppm and 1,000 ppm. The viscosities of the diluted solutions are then determined. The results of these tests are shown in Table VIII below.

TABLE VIII

ACRYLAMIDE POLYMERIZATION AND DILUTION IN OIL FIELD BRINE NO. 2

| Test No. | Quantity of Polymer in Dilute Solution Tested, parts per million | Viscosity[1] of Solution Tested, centipoises |
|---|---|---|
| 1 | 5,000 | 56 |
| 2 | 2,500 | 10 |

TABLE VIII-continued

ACRYLAMIDE POLYMERIZATION AND DILUTION IN OIL FIELD BRINE NO. 2

| Test No. | Quantity of Polymer in Dilute Solution Tested, parts per million | Viscosity[1] of Solution Tested, centipoises |
|---|---|---|
| 3 | 1,000 | 5 |
| 4 | 5,000[2] | 12.5 |
| 5 | 2,500[2] | 5 |
| 6 | 1,000[2] | 3 |

[1]Brookfield Viscometer using Spindle No. 1 at 30 rpm.
[2]Catalyst increased in preparing concentrated solution from 1.8 cc to 3.6 cc of 1% by weight sodium persulfate solution.

An examination of Tests 1-3 of Table VIII indicates that substantial diluted solution apparent viscosities are obtained at polymer concentrations of 5000 ppm, 2500 ppm and 1000 ppm in oil field brine No. 2. As indicated in Tests 4-6, the quantity of catalyst utilized in the preparation of the concentrated polymer solution is doubled. This increase in catalyst has the expected effect of reducing the apparent viscosities of the diluted solutions because the presence of the excess catalyst prevents the formation of polymers of as long a chain length and as high a molecular weight. The reduced chain length and molecular weight of the polymer brings about a reduction in viscosity produced thereby. In all of the diluted polymer solutions, no evidence of precipitate formation or of polymer incompatibility with oil field brine No. 2 is detected.

EXAMPLE 8

Acrylamide monomers are polymerized in fresh water and synthetic brine in accordance with the third procedure described above at 100° F. The concentration of polymer in some of the polymer solutions formed as well as the apparent viscosities thereof are determined. Portions of the concentrated solutions are diluted with synthetic brines and fresh water and the apparent viscosities of the diluted solutions are determined. The results of these tests are given in Table IX below.

TABLE IX

ACRYLAMIDE POLYMERIZATION AND DILUTION IN VARIOUS AQUEOUS SOLUTIONS

| Test No. | Aqueous Solution Used to Prepare Concentrated Polymer Solution | Diluent Used | Quantity of Polymer in Concentrated Solution or Dilution Solution, ppm | Degree of Hydration % | Viscosity of Solution Tested cp |
|---|---|---|---|---|---|
| 1 | Fresh Water | None | 38,400 | 0.01 | 1,524,295 ± 51,835,[1,2] |
| 2 | 2% NaCl[3] | None | 38,400 | 0.11 | 875,235[2] |
| 3 | 5% NaCl[3] | None | 38,400 | 0.10 | 756,960[2] |
| 4 | 10% NaCl[3] | None | 38,400 | 0.26 | 125,160[2] |
| 5 | 24% NaCl[3] | None | 38,400 | 0.23 | 222,440[2] |
| 6 | 2% CaCl$_2$[3] | None | 38,400 | 0.4 | 1,092,280[2] |
| 7 | 5% CaCl$_2$[3] | None | 38,400 | 0.08 | 972,760[2] |
| 8 | 10% CaCl$_2$[3] | None | 38,400 | 0.25 | 79,680[2] |
| 9 | 20% CaCl$_2$[3] | None | 38,400 | | 146[5] |
| 10 | 5% MgSO$_4$[3] | None | 38,400 | | 1,660,000[2] |
| 11 | 5% MgSO$_4$[3] | 5% MgSO$_4$[3] | 5,000 | | 135[4] |
| 12 | 5% CaCl$_2$[3] | 5% CaCl$_2$[3] | 5,000 | | 83[4] |
| 13 | 5% NaCl[3] | 5% NaCl[3] | 5,000 | | 90[4] |
| 14 | 5% CaCl$_2$[3] | Fresh Water | 5,000 | | 51[4] |
| 15 | 5% CaCl$_2$[3] | 5% CaCl$_2$[3] | 2,500 | | 15.4[4] |
| 16 | 5% CaCl$_2$[3] | Fresh Water | 2,500 | | 10.8[4] |
| 17 | Fresh Water | 5% CaCl$_2$[3] | 5,000 | | 187.4[4] |
| 18 | Fresh Water | 5% CaCl$_2$[3] | 2,500 | | 30.8[4] |

TABLE IX-continued
ACRYLAMIDE POLYMERIZATION AND DILUTION IN VARIOUS AQUEOUS SOLUTIONS

| Test No. | Aqueous Solution Used to Prepare Concentrated Polymer Solution | Diluent Used | Quantity of Polymer in Concentrated Solution or Dilution Solution, ppm | Degree of Hydration % | Viscosity of Solution Tested cp |
|---|---|---|---|---|---|
| 19 | 10% CaCl$_2$[3] | 10% CaCl$_2$[3] | 5,000 | | 19.5[6] |

[1]Average from two polymerizations ± average deviation
[2]Brookfield LVT Viscometer using the Heliopath accessory with Spindle T-F at 0.6 rpm.
[3]Weight percent
[4]Brookfield LVT Viscometer using Spindle No. 1 at 30 rpm
[5]Brookfield LVT Viscometer using the Heliopath accessory with Spindle T-B at 6 rpm
[6]Brookfield LVT Viscometer using Spindle No. 1 at 12 rpm All of the test solutions shown in Table IX are formed with no detectable precipitate formation even at sodium chloride concentrations as high as 24% by weight (240,000 ppm) and calcium chloride concentrations as high as 20% by weight (200,000 ppm). The results of Test 10 (Table IX) indicate that the polymer can be prepared in the presence of other divalent metal ions besides calcium. A highly viscous solution was formed in 5% aqueous magnesium sulfate.

The apparent viscosity of the concentrated polymer solution prepared in an aqueous 2% calcium chloride solution (Test No. 6) is slightly greater than that of the polymer solution prepared in 2% sodium chloride (Test No. 2). The same trend is apparent in comparing the concentrated polymer solution prepared in a 5% calcium chloride solution (Test No. 7) or 5% magnesium sulfate solution (Test No. 10) with concentrated polymer solution prepared in a 5% sodium chloride solution (Test No. 2). Only at a salt concentration of 10% was the polymer prepared in calcium chloride brine less viscous than the polymer prepared in sodium chloride brine. This behavior is somewhat unexpected in that published data indicate that the viscosities of most aqueous polyacrylamide solutions are much more sensitive to divalent metal cations than to monovalent metal cations, i.e., that divalent metal cations reduce polymer solution viscosities more than monovalent metal cations. Upon dilution of the concentrated polymer solutions to polymer concentrations of 5000 ppm, the solution prepared and diluted with 5% calcium chloride solution (Test No. 12) and the solution prepared and diluted with 5% sodium chloride solution (Test No. 13) have apparent viscosities which are nearly identical. Of particular significance is the fact that higher viiscosities are often obtained when the polymer solution is diluted with a diluent which is the same as the aqueous solvent in which the polymerization reaction is carried out. This fact can be seen by comparing Tests Nos. 12 and 14 of Table IX. Despite the lower calcium ion concentration obtained when the concentrated polymer solution prepared in a 5% calcium chloride solution is diluted in fresh water, such solution has a significantly lower apparent viscosity than when the concentrated polymer solution is diluted with 5% calcium chloride solution. Similar results are obtained at polymer concentrations of 2500 ppm (see Tests Nos. 15 and 16).

The polymerization solvent is more critical than the diluent in determining final solution viscosity. When the aqueous solution utilized for carrying out the polymerization is fresh water and the concentrated polymer solution is diluted with a 5% calcium chloride solution, the diluted solution has a greater apparent viscosity at the polymer concentrations of 5000 ppm (see Tests Nos. 12 and 17), as well as at polymer concentrations of 2500 ppm (see Tests Nos. 15 and 18) as compared to a polymer prepared in 5% calcium chloride solution and diluted with fresh water.

Thus, the apparent viscosity of a polymer solution prepared in an aqueous fluid is often greater when the same aqueous fluid is used as a diluent than when a different diluent is used. Further, when the polymerization solvent and diluent are the same, the final solution viscosity is greater even though the salt concentration in the diluted solution is higher. The weight average molecular weight of the polymer prepared in fresh water (Test No. 1) was 5,700,000. A polymer prepared in 10% sodium chloride (Test No. 4) had a weight average molecular weight of 1,000,000. When prepared in 5% calcium chloride, the polymer had a weight average molecular weight of 3,000,000. Thus, polymers of substantial molecular weight can be prepared in high salinity brines.

EXAMPLE 9

The diluted viscosity values of the polymer concentrates prepared in Example 8 are only a function of the total ionic strength of the diluent and not the individual concentrations of the monovalent metal salts and divalent metal salts actually present as illustrated by the tests summarized in Table X.

TABLE X
POLYACRYLAMIDE DILUTION IN VARIOUS AQUEOUS SOLUTIONS

| Test No. | Aqueous Solution Used to Prepare Concentrated Polymer Solution | Diluent | Final Polymer Concentration ppm | Solution Viscosity Centipoises |
|---|---|---|---|---|
| 1 | 10% CaCl$_2$ | 10% NaCl | 5,000 | 24[1] |
| 2 | 10% CaCl$_2$ | 10% CaCl$_2$ | 5,000 | 28[1] |
| 3 | 2% CaCl$_2$ | 2% CaCl$_2$ | 5,000 | 78[2] |
| 4 | 2% CaCl$_2$ | 2% NaCl | 5,000 | 80[2] |
| 5 | 2% NaCl | 10% NaCl | 5,000 | 108[2] |
| 6 | 2% NaCl | 10% CaCl$_2$ | 5,000 | 108[2] |

[1]Brookfield LVT Viscometer using the UL adapter at 6 rpm
[2]Brookfield LVT Viscometer using spindle number 1 at 12 rpm Comparison of Tests Nos. 1 and 2 indicate that when a polymer prepared in 10% calcium chloride solution is diluted, the presence of divalent calcium ion does not reduce the final solution viscosity. If anything, the viscosity of the sample diluted in 10% calcium chloride solution is greater than that of the sample diluted in 10% sodium chloride solution, illustrating the unexpected advantage often obtained when the same solvent is used to both prepare and dilute the polymer.

A 2% calcium chloride brine is used as the polymerization media in Tests Nos. 3 and 4. The final solution viscosities using 2% calcium chloride brine and 2% sodium chloride brine as the diluents does not differ significantly. Similar results are noted when 2% sodium chloride brine is the polymerization solvent and 10% sodium chloride solution and 10% calcium chloride solution are used as diluents (Tests Nos. 5 and 6).

EXAMPLE 10

N,N-dimethylacrylamide monomer is polymerized in fresh water using the third procedure described above at 117° F. Portions of the resulting concentrated polymer solution are diluted using fresh water and oil field brine No. 1 and the viscosities of the diluted solutions are determined. The results of these tests are given in Table XI below.

TABLE XI
N,N—DIMETHYLACRYLAMIDE POLYMERIZATION IN FRESH WATER AND DILUTION IN FRESH WATER AND OIL FIELD BRINE NO. 1

| Test No. | Diluent Used | Quantity of Polymer in Dilute Solution Tested, ppm | Viscosity of Test Solution, Centipoises[1] |
|---|---|---|---|
| 1 | Fresh Water | 5,000 | 17 |
| 2 | Fresh Water | 2,500 | 8 |
| 3 | Fresh Water | 1,000 | 3.4–4[2] |
| 4 | Oil Field Brine No. 1 | 5,000 | 22 |
| 5 | Oil Field Brine No. 1 | 2,500 | 8.4–9.6[2] |
| 6 | Oil Field Brine No. 1 | 1,000 | 7.0–5.2[2] |

[1]Brookfield Viscometer using Spindle No. 1 at 30 rpm
[2]Two test solutions of same concentration tested.

EXAMPLE 11

The data summarized in Table XII illustrate that the process of this invention may be carried out in the presence of certain cationic organic polymer clay stabilizers. Polymers are prepared using the first procedure described previously with fresh water as the aqueous fluid. Reaction temperature is 100° F. and 0.036 g sodium persulfate and 1.0 g of poly(diallyldimethylammonium chloride) are added. An identical experiment is run simultaneously omitting the poly(diallyldimethylammonium chloride). The results summarized in Table XII indicate that the cationic organic polymer accelerates the polymerization and that while the final solution viscosity is perhaps slightly lower than obtained in the control experiments an excellent flood polymer is prepared.

TABLE XII
EFFECT OF A CATIONIC ORGANIC POLYMER ON VISCOSITY DEVELOPMENT DURING POLYMERIZATION

| | Viscosity (cps)[1] With Cationic Organic Polymer Added | |
|---|---|---|
| Elapsed Time | None | DADMAC[2] |
| 4 | 5,040 | 27,200 |
| 6 | 69,600 | 53,200 |
| 6.5–17.5 | 80,000 | 73,200 |

TABLE XII-continued
EFFECT OF A CATIONIC ORGANIC POLYMER ON VISCOSITY DEVELOPMENT DURING POLYMERIZATION

| | Viscosity (cps)[1] With Cationic Organic Polymer Added | |
|---|---|---|
| Elapsed Time | None | DADMAC[2] |
| 17.5 | 3,200,000[3] | 3,200,000[3] |

[1]Viscosity determined using a Brookfield RVT Viscometer spindle 4 at 20 rpm unless otherwise noted.
[2]Abbreviation for poly(diallyldimethylammonium chloride)
[3]Spindle number 4 at 0.5 rpm is used to measure viscosity

What is claimed is:

1. A method of enhancing the recovery of oil from a subterranean oil-containing formation comprising injecting a viscous aqueous solution containing one or more water-soluble organic polymers into the formation by way of at least one injection well penetrating the formation and forced through the formation towards at least one production well penetrating the formation, and further comprising
combining water-soluble polymerizable vinyl monomers and a water-soluble ionizing sulfite with an aqueous inorganic salt solution at the site of said injection and production wells whereby said monomers are rapidly polymerized to form a concentrated high viscosity polymer solution, said water-soluble polymerizable vinyl monomers being selected from the group consisting of acrylamide monomers alone, and acrylamide monomers and one or more other vinyl monomers which are copolymerizable therewith;
diluting said concentrated high viscosity polymer solution with additional aqueous fluid at the site of said injection and production wells to form an injection solution having a desired viscosity; and injecting said injection solution into said formation.

2. The method of claim 1 which is further characterized to include the step of combining a buffer with said aqueous inorganic salt solution in a quantity sufficient to maintain the pH thereof at about 7 prior to combining said monomers and said sodium sulfite with said solution.

3. The method of claim 2 wherein said water-soluble ionizing sulfite is selected from the group consisting of alkaline metals, ammonium and substituted ammonium sulfites, bisulfites, pyrosulfites, metabisulfites, and mixtures thereof.

4. The method of claim 2 wherein said water-soluble ionizing sulfite is sodium sulfite.

5. The method of claim 1 wherein said aqueous inorganic salt solution contains one or more salts selected from the group consisting of alkali metal salts of strong inorganic acids.

6. The method of claim 1 wherein said water-soluble polymerizable vinyl monomers are acrylamide monomers alone and the polymer formed is polyacrylamide.

7. The method of claim 1 wherein said water-soluble polymerizable vinyl monomers are acrylamide monomers and acrylic acid monomers and the polymer formed is a copolymer of acrylamide and and a salt of acrylic acid.

8. The method of claim 5 wherein said aqueous inorganic salt solution contains one or more of said salts in a concentration of at least about 12% by weight of said solution.

9. The method of claim 8 wherein said water-soluble polymerizable vinyl monomers are combined with said aqueous salt solution in an amount in the range of from about 1% to about 10% by weight of the resulting aqueous monomer-salt solution.

10. The method of claim 9 wherein said water-soluble ionizing sulfite is combined with said aqueous monomer-salt solution in an amount in the range of from about 0.001% to about 0.1% by weight of the resulting aqueous sulfite-monomer-salt solution.

* * * * *